(12) United States Patent
Takagi et al.

(10) Patent No.: US 8,972,142 B2
(45) Date of Patent: Mar. 3, 2015

(54) TRAVEL SUPPORT APPARATUS

(75) Inventors: Toshihiro Takagi, Susono (JP);
Mitsuhiko Morita, Suntoh-gun (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 0 days.

(21) Appl. No.: 13/979,001

(22) PCT Filed: Jan. 3, 2012

(86) PCT No.: PCT/IB2012/000002
§ 371 (c)(1),
(2), (4) Date: Jul. 10, 2013

(87) PCT Pub. No.: WO2012/095715
PCT Pub. Date: Jul. 19, 2012

(65) Prior Publication Data
US 2013/0282252 A1    Oct. 24, 2013

(30) Foreign Application Priority Data
Jan. 12, 2011   (JP) .................................. 2011-004319

(51) Int. Cl.
| | |
|---|---|
| *B60T 7/12* | (2006.01) |
| *G08G 1/16* | (2006.01) |
| *B60T 7/22* | (2006.01) |
| *B60W 30/18* | (2012.01) |
| *B60W 30/095* | (2012.01) |

(52) U.S. Cl.
CPC ... *G08G 1/16* (2013.01); *B60T 7/22* (2013.01); *B60W 30/18036* (2013.01); *B60T 2230/08* (2013.01); *B60W 30/0953* (2013.01); *B60W 2540/16* (2013.01); *B60W 2550/308* (2013.01)

USPC .......................................................... 701/70

(58) Field of Classification Search
CPC ................ B60W 2050/0073; B60W 30/18036
USPC .......................................................... 701/70
See application file for complete search history.

(56) References Cited

U.S. PATENT DOCUMENTS

| 4,664,218 A * | 5/1987 | Graham et al. ................ 180/272 |
| 5,598,164 A * | 1/1997 | Reppas et al. ................... 342/70 |
| 5,864,285 A * | 1/1999 | Wieder et al. .................. 340/435 |
| 6,342,832 B1 * | 1/2002 | Fuchs et al. .................... 340/436 |
| 7,719,410 B2 * | 5/2010 | Labuhn et al. ................. 340/435 |
| 7,957,874 B2 * | 6/2011 | Labuhn et al. ................... 701/70 |

(Continued)

FOREIGN PATENT DOCUMENTS

| EP | 1238876 A1 * | 9/2002 | ................ B60T 7/12 |
| EP | 1 349 131 A1 | 10/2003 | |

(Continued)

*Primary Examiner* — Behrang Badii
*Assistant Examiner* — David Testardi
(74) *Attorney, Agent, or Firm* — Oliff PLC

(57) ABSTRACT

A travel support apparatus includes: a rear sensor that detects an obstacle behind a vehicle; and a rear contact prevention device that controls travel of the vehicle to prevent contact between the vehicle and the obstacle detected by the rear sensor as the vehicle backs up. The rear contact prevention device prevents contact between the vehicle and the obstacle detected by the rear sensor as the vehicle backs up, by performing first travel control to apply at least one of speed limitation and deceleration to the vehicle, without requiring an operation performed by a driver of the vehicle, and then performs second travel control to reduce an operation amount set in the first travel control.

9 Claims, 18 Drawing Sheets

(56) References Cited

U.S. PATENT DOCUMENTS

| | | | |
|---|---|---|---|
| 7,975,798 B2 * | 7/2011 | Lucas et al. | 180/275 |
| 8,185,273 B2 * | 5/2012 | Lich et al. | 701/45 |
| 8,229,665 B2 * | 7/2012 | Hamaguchi et al. | 701/301 |
| 8,706,372 B2 * | 4/2014 | Cetinkaya et al. | 701/70 |
| 2003/0004617 A1 | 1/2003 | Kimura et al. | |
| 2008/0167781 A1* | 7/2008 | Labuhn et al. | 701/48 |
| 2009/0009306 A1 | 1/2009 | Magane et al. | |
| 2009/0204296 A1* | 8/2009 | Lich et al. | 701/45 |
| 2010/0023234 A1 | 1/2010 | Kameyama | |
| 2010/0030439 A1 | 2/2010 | Hamaguchi et al. | |

FOREIGN PATENT DOCUMENTS

| | | | | |
|---|---|---|---|---|
| FR | 2796601 A1 * | 1/2001 | | B60K 41/20 |
| FR | 2833542 A1 * | 6/2003 | | B60K 41/20 |
| JP | A-07-52680 | 2/1995 | | |
| JP | A-07-133733 | 5/1995 | | |
| JP | A-2003-081042 | 3/2003 | | |
| JP | A-2003-114276 | 4/2003 | | |
| JP | A-2006-123711 | 5/2006 | | |
| JP | A-2009-014560 | 1/2009 | | |
| JP | A-2010-023769 | 2/2010 | | |
| JP | A-2010-030576 | 2/2010 | | |
| JP | 2010137772 A * | 6/2010 | | |
| JP | A-2012-144157 | 8/2012 | | |
| JP | A-2012-144162 | 8/2012 | | |
| WO | WO 9800730 A1 * | 1/1998 | | G01S 15/06 |
| WO | WO 2009025201 A1 * | 2/2009 | | B60T 7/22 |
| WO | WO 2012/095716 A1 | 7/2012 | | |
| WO | WO 2012/095717 A2 | 7/2012 | | |

* cited by examiner

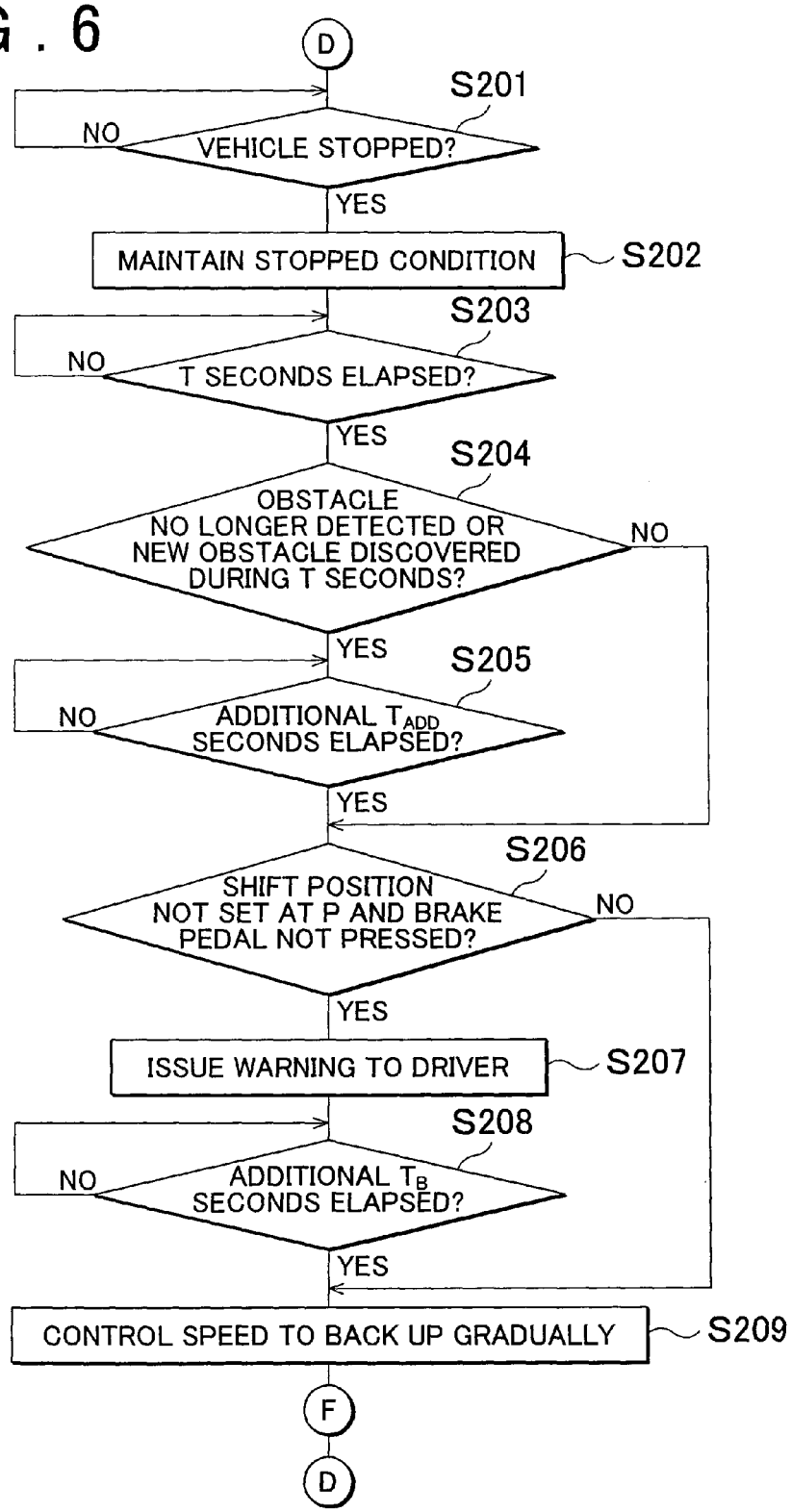

F I G . 12
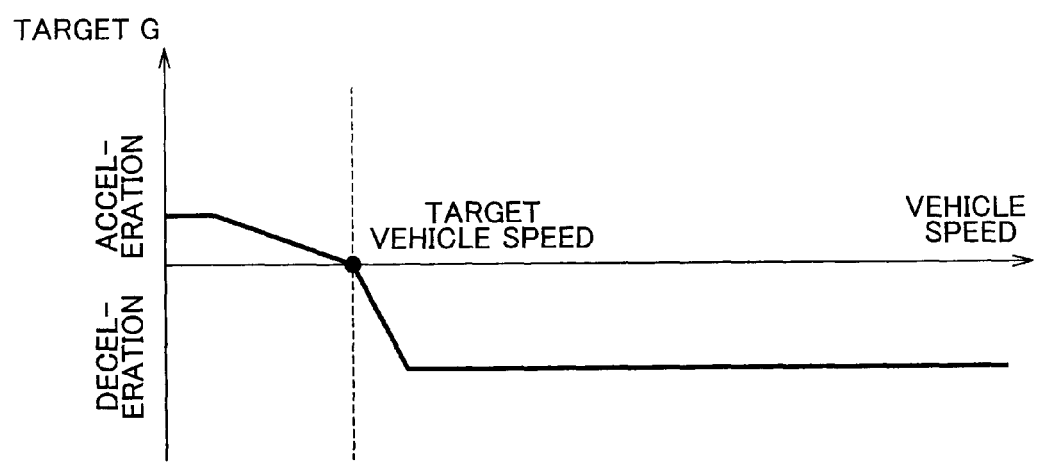

TRAVEL SUPPORT APPARATUS

BACKGROUND OF THE INVENTION

1. Field of the Invention

The invention relates to a travel support apparatus, and more particularly to a travel support apparatus that controls travel of a vehicle so as to prevent contact between the vehicle and an obstacle as the vehicle backs up.

2. Description of Related Art

An apparatus that controls travel of a vehicle so as to prevent contact between the vehicle and an obstacle has been proposed. For example, Japanese Patent Application Publication No. 2006-123711 (JP-A-2006-123711) proposes an apparatus that is capable of securing safety even when a driver mistakenly performs an acceleration operation when intending to perform a braking operation. This apparatus includes: a front ultrasonic sensor and a rear ultrasonic sensor each of which detects a distance and a relative speed between the vehicle and an obstacle existing in a moving direction of the vehicle when the vehicle moves forward or backs up; means for detecting an acceleration request amount from the driver of the vehicle; a collision possibility determination unit that determines whether there is a possibility of a collision between the vehicle and the obstacle based on the distance and relative speed between the vehicle and the obstacle detected by the front ultrasonic sensor or the rear ultrasonic sensor; and means for braking the vehicle by recognizing a detected acceleration request as a braking request from the driver when the collision possibility determination unit determines that there is a possibility of a collision.

In the technique described above, however, control is performed to apply a brake to the vehicle every time it is determined that there is a possibility of a collision with the obstacle detected by the front ultrasonic sensor or rear ultrasonic sensor. This may be bothersome to the driver. In particular, with this technique, it is not possible to respond to a situation in which the driver of the vehicle wishes to accelerate the vehicle in order to, for example, move closer to the obstacle. Further, since the control for applying a brake to the vehicle is always performed, the driver may rely too much on the apparatus.

SUMMARY OF THE INVENTION

The invention provides a travel support apparatus that responds more closely to requests from a driver, and prevents the driver from relying too much on the apparatus.

An aspect of the invention relates to a travel support apparatus. The travel support apparatus includes: a rear sensor that detects an obstacle behind a vehicle; and a rear contact prevention device that controls travel of the vehicle to prevent contact between the vehicle and the obstacle detected by the rear sensor as the vehicle backs up. The rear contact prevention device performs travel control including first travel control and second travel control, and the rear contact prevention device prevents contact between the vehicle and the obstacle detected by the rear sensor as the vehicle backs up, by performing the first travel control to apply at least one of speed limitation and deceleration to the vehicle, without requiring an operation performed by a driver of the vehicle, and then performs the second travel control to reduce an operation amount set in the first travel control.

According to this configuration, the travel support device includes the rear sensor that detects an obstacle behind the vehicle and the rear contact prevention device that controls travel of the vehicle to prevent contact between the vehicle and the obstacle detected by the rear sensor as the vehicle backs up. Therefore, contact between the vehicle and the obstacle can be prevented when the vehicle backs up. Further, the rear contact prevention device prevents contact between the vehicle and the obstacle detected by the rear sensor as the vehicle backs up, by performing the first travel control to apply at least one of speed limitation and deceleration to the vehicle, without requiring the operation performed by the driver of the vehicle, and then performs the second travel control to reduce the operation amount set in the first travel control. Hence, it is possible to respond to a situation in which the driver of the vehicle wishes to accelerate the vehicle in order to, for example, move closer to the obstacle or the like after the vehicle has been decelerated in relation to the obstacle by the rear contact prevention device. Further, it is possible to avoid a situation in which the rear contact prevention device decelerates the vehicle in relation to the obstacle indefinitely such that the driver of the vehicle relies too much on the travel support apparatus.

In the aspect of the invention described above, when the vehicle approaches the obstacle detected by the rear sensor while backing up, the rear contact prevention device may perform the first travel control, and then perform the second travel control.

According to this configuration, when the vehicle approaches the obstacle detected by the rear sensor while backing up, the rear contact prevention device performs the first travel control and then performs the second travel control. Therefore, the first travel control is performed in relation to an obstacle toward which the vehicle is moving and which the vehicle is likely to contact, and as a result, contact can be prevented. Further, it is possible to respond to a situation in which the driver of the vehicle wishes to accelerate the vehicle in order to, for example, move closer to the obstacle or the like after the vehicle has been decelerated in relation to the obstacle by the rear contact prevention device. Furthermore, it is possible to avoid a situation in which the rear contact prevention device decelerates the vehicle in relation to the obstacle indefinitely such that the driver of the vehicle relies too much on the travel support apparatus.

Further, the rear contact prevention device may perform the second travel control when a predetermined condition is satisfied after the first travel control is performed.

According to this configuration, the rear contact prevention device performs the second travel control when a predetermined condition is satisfied after the first travel control is performed. Hence, by setting the condition appropriately, it is possible to respond to a situation in which the driver wishes to accelerate the vehicle while preventing the driver from relying too much on the travel support apparatus.

Further, the rear contact prevention device may cause the vehicle to restart backing up by performing the second travel control to gradually reduce the operation amount set in the first travel control, after performing the first travel control.

According to this configuration, the rear contact prevention device causes the vehicle to restart backing up by performing the second travel control to gradually reduce the operation amount set in the first travel control, after performing the first travel control. Hence, it is possible to avoid a situation in which the vehicle is rapidly started or rapidly accelerated when the accelerator pedal is depressed by the driver at the time at which the deceleration control or the stopping control is stopped.

Further, the rear contact prevention device may reduce the operation amount in the first travel control in accordance with an accelerator pedal operation performed by the driver of the vehicle when the first travel control is underway.

According to this configuration, the rear contact prevention device reduces the operation amount in the first travel control in accordance with an accelerator pedal operation performed by the driver of the vehicle when the first travel control is underway. It is therefore possible to respond to a situation in which the driver wishes to accelerate the vehicle after having understood that an obstacle exists behind the vehicle and a situation in which the vehicle may be stopped by the first travel control, for example, when the vehicle backs up on an uphill gradient or when a steering angle is extremely large, in accordance with the accelerator pedal operation performed by the driver.

Furthermore, the obstacle may include a first obstacle and a second obstacle, and when the second obstacle is detected by the rear sensor after the first travel control is performed to prevent contact between the vehicle and the first obstacle detected by the rear sensor as the vehicle backs up, the rear contact prevention device may perform the first travel control to prevent contact between the vehicle and the second obstacle.

According to this configuration, the rear contact prevention device performs the first travel control to prevent contact between the vehicle and the second obstacle when the second obstacle is detected by the rear sensor after the first travel control is performed to prevent contact between the vehicle and the first obstacle detected by the rear sensor as the vehicle backs up. Hence, even when the operation amount set in the first travel control relating to the first obstacle has been reduced, the first travel control is performed in relation to the newly detected second obstacle, and therefore contact between the vehicle and the second obstacle can be prevented in a case where the driver of the vehicle does not notice the second obstacle or wants the travel support apparatus to perform the first travel control.

Further, the rear contact prevention device may be configured such that after the first travel control is performed to prevent contact between the vehicle and the obstacle detected by the rear sensor as the vehicle backs up, the first travel control is not performed in relation to the obstacle.

According to this configuration, after the first travel control is performed to prevent contact between the vehicle and the obstacle detected by the rear sensor as the vehicle backs up, the rear contact prevention device does not perform the first travel control in relation to the obstacle. Hence, it is possible to respond to a situation in which the driver of the vehicle wishes to back up the vehicle further toward an obstacle for which the first travel control has been performed once.

With the travel support device according to this aspect of the invention, it is possible to respond to a situation in which the driver of the vehicle wishes to accelerate the vehicle in order to, for example, move closer to an obstacle. Further, it is possible to avoid a situation in which the vehicle is decelerated indefinitely in relation to an obstacle such that the driver of the vehicle relies too much on the travel support apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart showing in detail operations performed after the vehicle has stopped in FIG. 2;

FIG. 12 is a graph showing the target G relative to the vehicle speed when the vehicle restarts backing up after being stopped;

DETAILED DESCRIPTION OF EMBODIMENTS

Figure 1:
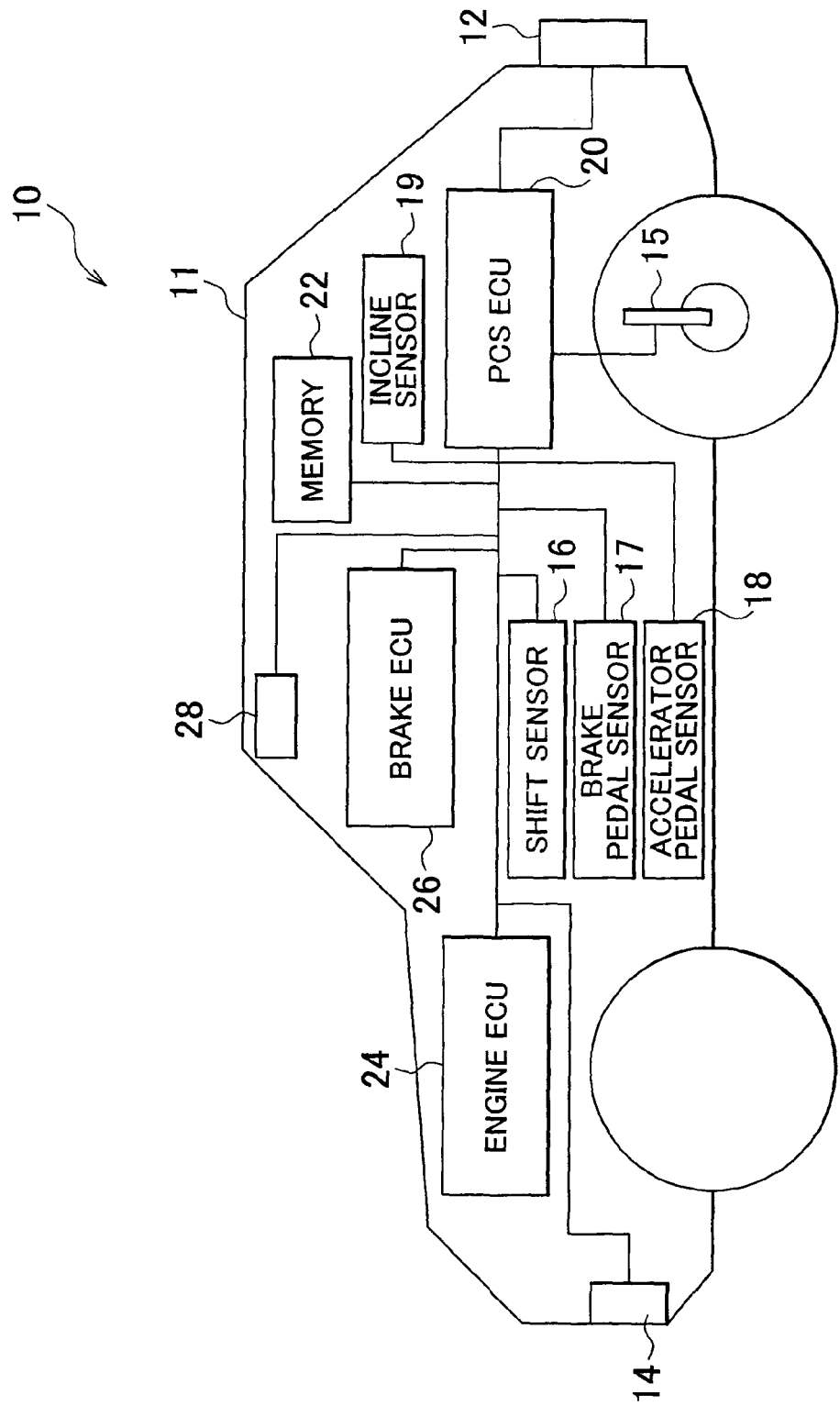
FIG. 1 is a block diagram showing a configuration of a travel support apparatus according to an embodiment.

A travel support apparatus according to an embodiment of the invention will be described below with reference to the drawings. As shown in FIG. 1, a travel support apparatus 10 according to this embodiment, which includes a sonar 12, a radar 14, a vehicle wheel speed sensor 15, a shift sensor 16, a brake pedal sensor 17, an accelerator pedal sensor 18, an incline sensor 19, a Pre-Crash Safety Electronic Control Unit (PCS ECU) 20, a memory 22, an engine ECU 24, a brake ECU 26, and a display device 28, is provided in a vehicle 11. The travel support apparatus 10 according to this embodiment controls travel of the vehicle 11 to avoid contact with an obstacle both when the vehicle 11 travels forward and when the vehicle 11 backs up, not only during parking. More specifically, the travel support apparatus 10 according to this embodiment is used to avoid contact with an obstacle disposed along the way not only during parking, but also when a driver wishes to move the vehicle 11 to a desired location while backing up the vehicle 11, for example. Similarly to a typical automobile, when the vehicle 11 according to this embodiment travels forward, a speed ratio of a transmission is lower than when the vehicle 11 backs up. In other words, the vehicle 11 travels at a higher speed when moving forward than when backing up.

The sonar 12 uses ultrasonic waves to detect an obstacle existing on a trajectory along which the vehicle is to back up, and detects a distance between the obstacle and the vehicle. At least one of a radar, a monocular camera, a stereo camera, and a laser radar (Light Detection and Ranging (LIDAR)) capable of detecting an obstacle positioned far from the vehicle may be supplementarily used as a device that detects an obstacle existing on the trajectory along which the vehicle is to back up.

The radar 14 uses radio waves to detect an obstacle existing on a trajectory along which the vehicle is to travel forward, and detects a distance between the obstacle and the vehicle. At least one of a monocular camera, a stereo camera, and a laser radar may also be used as a device that detects an obstacle that exists on the trajectory along which the vehicle is to travel forward. The radar 14 that detects an obstacle in front of the vehicle 11 is able to detect an obstacle positioned far from the vehicle 11 as compared to the sonar 12 that detects an obstacle behind the vehicle 11. Moreover, at an equal distance from the vehicle 11, a detection range of the radar 14 that detects an obstacle in front of the vehicle 11 is equal to or smaller than a detection range of the sonar 12 that detects an obstacle behind the vehicle 11, and the radar 14 has higher directivity than the sonar 12. A sonar that is able to detect an obstacle such as a person positioned close to the vehicle may be supplementarily provided as the device that detects an obstacle existing on the trajectory along which the vehicle is to travel forward.

The vehicle wheel speed sensor 15 is used to detect a rotation angle of a vehicle wheel of the vehicle 11 and calculate a movement distance of the vehicle 11 from the rotation angle and a diameter of the vehicle wheel. Further, the vehicle wheel speed sensor 15 is used to detect a vehicle speed of the vehicle 11 from the movement distance of the vehicle 11 per unit time. The vehicle wheel speed sensor 15 is attached to a hub bearing or the like of the vehicle wheel. Magnetic field variation is caused when a magnetic rotor on which S poles and N poles are alternately disposed rotates, and the magnetic field variation is detected by a sensor attached to a steering knuckle or the like, and thus, vehicle speed pulses are output. For example, when a total number of poles of the magnetic rotor is set as N, the vehicle wheel diameter is set as R, and a number of pulses detected per unit time is set as $P_n$, a vehicle movement distance $D_{pulse}$ per unit time is expressed as $D_{pulse}=P_n \times \pi R/N$.

The shift sensor 16 determines whether a shift position of the transmission of the vehicle 11 is set at a reverse "R" position or a forward "D" position. The brake pedal sensor 17 determines whether or not a brake pedal of the vehicle 11 has been depressed by the driver, and detects a depression amount of the brake pedal. The accelerator pedal sensor 18 determines whether or not an accelerator pedal of the vehicle 11 has been depressed by the driver, and detects a depression amount of the accelerator pedal. The incline sensor 19 determines whether the vehicle 11 is traveling forward or backing up on an uphill road or traveling forward or backing up on a downhill gradient.

When the vehicle 11 travels forward and when the vehicle 11 backs up, the PCS ECU 20 controls travel of the vehicle 11 by operating the engine ECU 24 and the brake ECU 26 to prevent contact between the vehicle 11 and an obstacle detected by the radar 14 or the sonar 12, based on information detected by the vehicle wheel speed sensor 15, shift sensor 16, brake pedal sensor 17, accelerator pedal sensor 18, and incline sensor 19, and displays various information on the display device 28.

The memory 22 stores the distance to the vehicle 11 and information indicating whether or not deceleration control and braking control, to be described below, have already been performed, with regard to each of obstacles detected by the radar 14 and the sonar 12.

When the vehicle 11 travels forward and when the vehicle 11 backs up, the engine ECU 24 prevents contact between the vehicle 11 and the obstacle detected by the radar 14 or the sonar 12 without requiring an operation performed by the driver, by controlling an accelerator operation amount of the vehicle 11 and limiting an output of an engine of the vehicle 11 based on a command signal from the PCS ECU 20. Note that in a case where the vehicle 11 is an electric vehicle that travels using an output of a motor, the engine ECU 24 limits the output of the motor. Alternatively, the engine ECU 24 prevents contact between the vehicle 11 and the obstacle detected by the radar 14 or the sonar 12 when the vehicle 11 travels forward and when the vehicle 11 backs up, by changing a reduction ratio of the transmission.

When the vehicle 11 travels forward and when the vehicle 11 backs up, the brake ECU 26 prevents contact between the vehicle 11 and the obstacle detected by the radar 14 or the sonar 12 without requiring an operation performed by the driver, by controlling a deceleration of the vehicle 11 based on a command signal from the PCS ECU 20. Note that in a case where the vehicle 11 is an electric vehicle that travels using the output of a motor, the brake ECU 26 prevents contact between the vehicle 11 and the obstacle detected by the radar 14 or the sonar 12, through regenerative braking, when the vehicle 11 travels forward and when the vehicle 11 backs up.

The display device 28 includes a display, a warning lamp, a speaker, a buzzer, and so on. The display device 28 prevents contact between the vehicle 11 and the obstacle detected by the radar 14 or the sonar 12 by displaying various information to the driver based on a command signal from the PCS ECU 20 when the vehicle 11 travels forward and when the vehicle 11 backs up. Alternatively, the display device 28 issues a warning relating to the obstacle detected by the radar 14 or the sonar 12 to the driver of the vehicle 11 and thus, reduces the effect of contact between the obstacle and the vehicle 11 by increasing a tension of a seatbelt provided in the vehicle 11. Note that in this embodiment, the PCS ECU 20 may issue a warning relating to the obstacle detected by the radar 14 or the sonar 12 through the display device 28 to the driver in addition to controlling the acceleration and deceleration of the vehicle 11 using the engine ECU 24 and the brake ECU 26.

Figure 2:
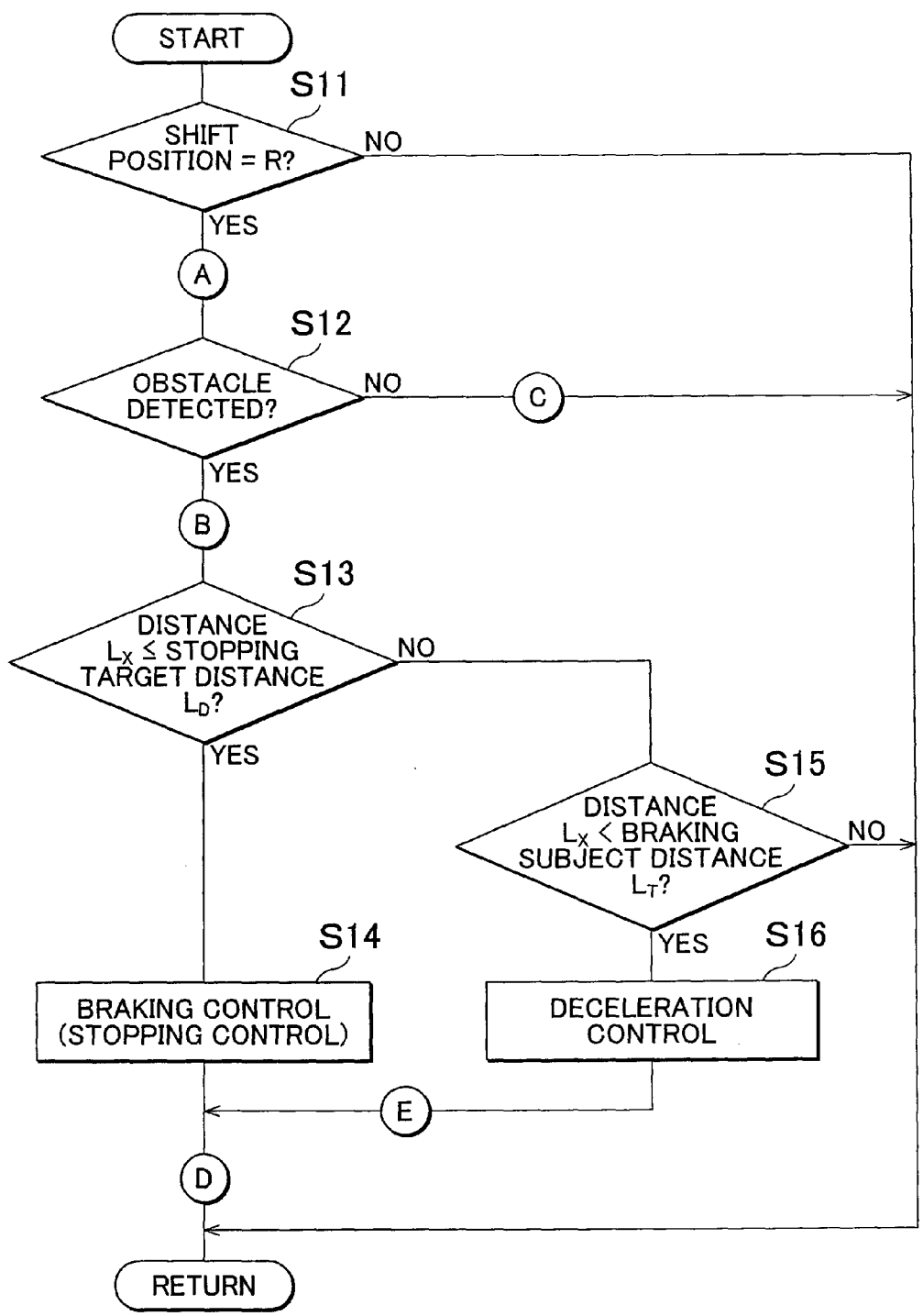
FIG. 2 is a flowchart showing an outline of operations performed by the travel support apparatus according to the embodiment.
Figure 3:
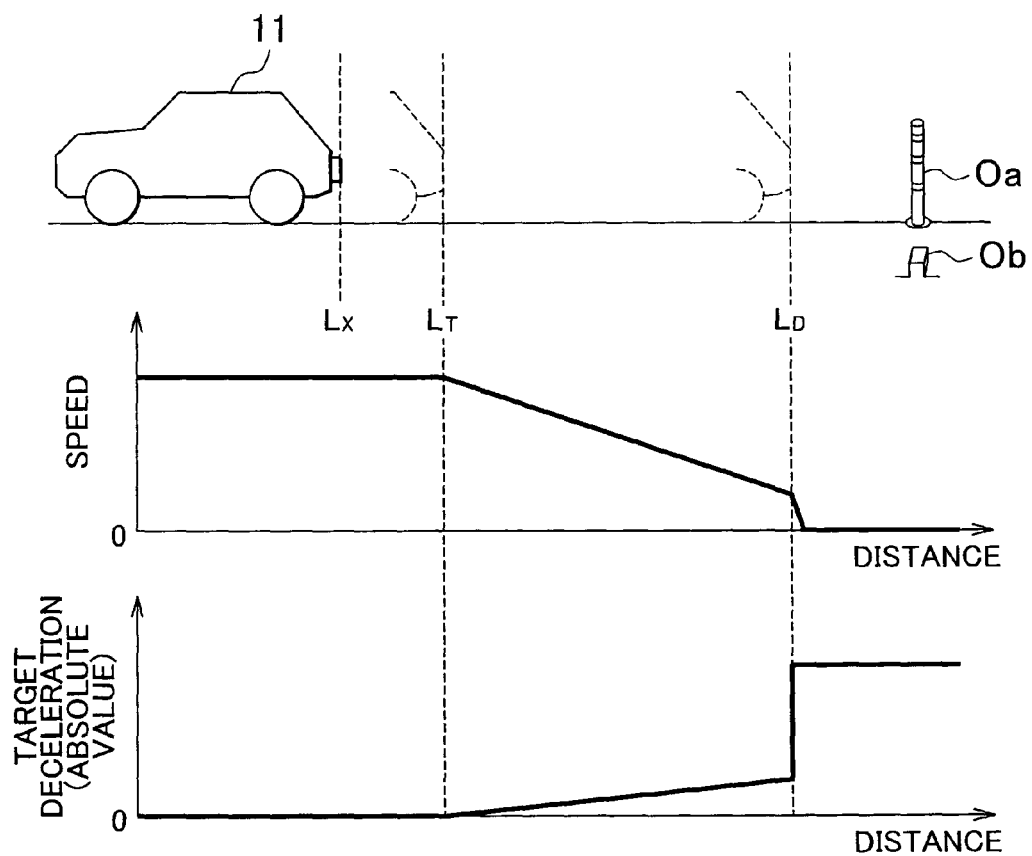
FIG. 3 is a view showing a relationship of a speed and a target deceleration of a vehicle relative to a distance between the vehicle and an obstacle.

Operations of the travel support apparatus 10 according to this embodiment will now be described. First, an outline of operations performed by the travel support apparatus 10 according to this embodiment when the vehicle 11 backs up will be described. As shown in FIG. 2, the PCS ECU 20 of the travel support apparatus 10 determines, using the shift sensor 16, that the shift position of the transmission of the vehicle 11 is set at the reverse "R" position (S11). As shown in FIGS. 2 and 3, the PCS ECU 20 then determines whether or not an obstacle Oa or an obstacle (a wheel block) Ob with which the vehicle 11 may come into contact has been detected behind the vehicle 11 by the sonar 12 (S12).

When the obstacle Oa or the like is detected (S12), the PCS ECU 20 determines whether or not a distance $L_X$ between the vehicle 11 and the obstacle Oa or the like, obtained by the sonar 12, is equal to or smaller than a predetermined stopping target distance $L_D$ (S13). The stopping target distance $L_D$ is set at a distance at which the vehicle 11 is positioned close to the obstacle Oa or the like safely without coming into contact therewith. When the distance $L_X$ is equal to or smaller than the predetermined stopping target distance $L_D$ (S13), the PCS ECU 20 stops the vehicle 11 by operating the brake ECU 26 to apply a large deceleration to the vehicle 11 (S14). Hereafter, this operation will be referred to as braking control or stopping control.

When the distance $L_X$ is greater than the predetermined stopping target distance $L_D$ (S13) and smaller than a braking subject distance $L_T$ that is greater than the stopping target distance $L_D$ (S15), the PCS ECU 20 operates the brake ECU 26 to apply a smaller deceleration than that of the stopping control to the vehicle 11 so that the vehicle 11 is stopped at a position away from the obstacle Oa by the stopping target distance $L_D$ (S16). The braking subject distance $L_T$ is set at a distance from which the vehicle 11 can be stopped at a position away from the obstacle Oa by the stopping target distance $L_D$, with a comparatively small deceleration. Hereafter, control to apply at least one of speed limitation and deceleration to the vehicle 11 when the distance $L_X$ is smaller than the braking subject distance $L_T$ will be referred to as deceleration control. The stopping control and the deceleration control may be regarded as first travel control according to the invention.

Figure 4:
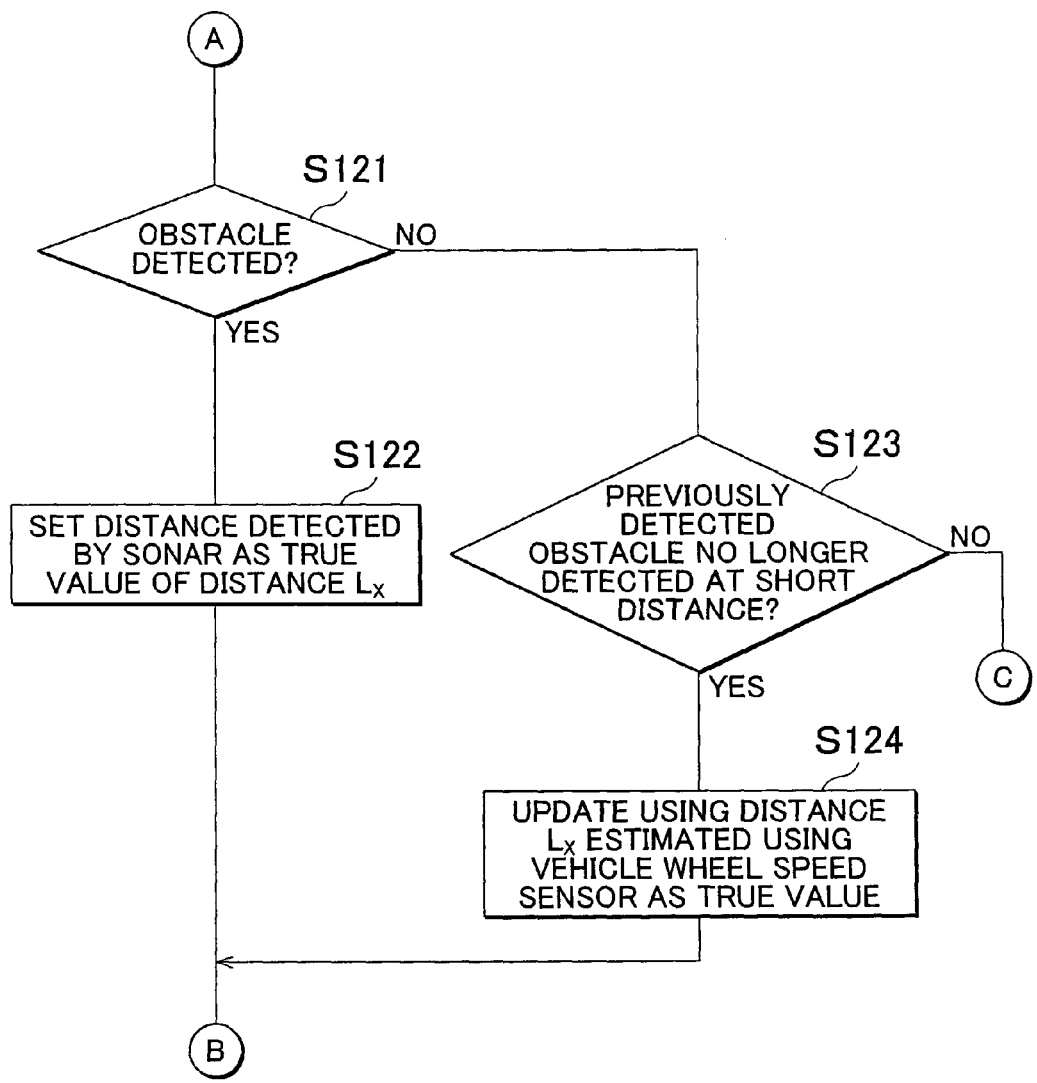
FIG. 4 is a flowchart showing in detail operations performed when an obstacle is detected in FIG. 2.
Figure 5A:
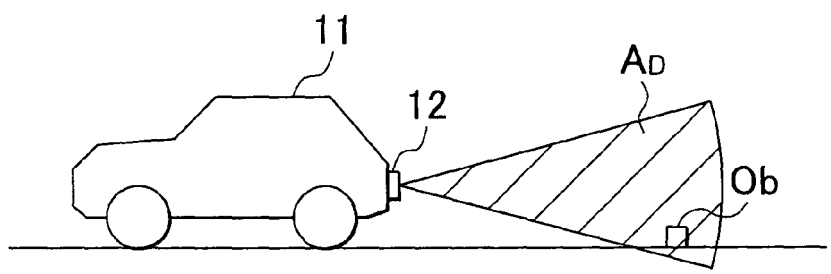
FIG. 5A is a side view showing a condition in which an obstacle can be detected by a sonar.
Figure 5B:
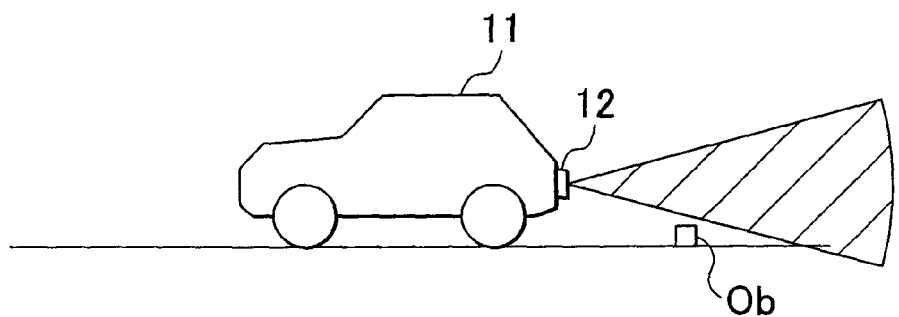
FIG. 5B is a side view showing a condition in which an obstacle cannot be detected by the sonar because the vehicle is too close to the obstacle.

Operations for detecting an obstacle will now be described in detail. As shown in FIG. 4, when the obstacle Oa or the like is detected continuously by the sonar 12 in S12 of FIG. 2 (S121), the PCS ECU 20 continues the processing described above using the distance detected by the sonar 12 as the distance $L_X$ (S122). As shown in FIG. 5A, an obstacle having a low height from the ground, such as the obstacle Ob, can be detected within a detection range $A_D$ of the sonar 12 installed in the vehicle 11. However, when the backing-up vehicle 11 is too close to the obstacle Ob, as shown in FIG. 5B, the obstacle Ob may be outside the detection range $A_D$ of the sonar 12, so that the obstacle Ob may no longer be detected.

Hence, in this embodiment, when the obstacle Ob or the like is not detected by the sonar 12 (S121) but was previously detected by the sonar 12, or in other words when the detected obstacle Ob or the like is no longer detected at a short distance (S123), the PCS ECU 20 updates a value of the distance Lx using the distance Lx between the vehicle 11 and the obstacle Ob or the like estimated based on the movement distance of the vehicle 11, detected by the vehicle wheel speed sensor 15, as a true value (S124), and then continues the processing described above.

More specifically, when the sonar 12 no longer detects the detected obstacle Ob or the like at or below an extrapolatable distance $L_P$ ($L_D < L_P < L_T$), the PCS ECU 20 calculates a true value of the distance $L_X$ to the obstacle Ob or the like by calculating the movement distance of the vehicle 11 from the vehicle wheel diameter of the vehicle 11 and the rotation angle of the vehicle wheel per unit time detected by the vehicle wheel speed sensor 15, and subtracting the movement distance from the distance $L_X$ to the obstacle Ob or the like, which was obtained immediately before the obstacle Ob or the like was no longer detected. Note that a value of the extrapolatable distance $L_P$ is set in accordance with a minimum detection distance $D_{min}$ of the sonar 12. For example, $L_P = D_{min} + \Delta D$ ($\Delta D > 0$).

Sensors such as the sonar 12, an image camera, a radar, and a LIDAR are typically incapable of detecting the obstacle Ob or the like at extremely short distances, as described above, and therefore the detected obstacle Ob or the like may no longer be detected. In this embodiment, when the sonar 12 can no longer detect the obstacle Ob or the like at the minimum detection distance $D_{min}$, the distance $L_X$ to the obstacle Ob is estimated based on the movement distance of the vehicle 11, and the control is continued based on the distance $L_X$. Therefore, the control can be performed at or below a distance at which the sonar 12 is unable to detect the obstacle Ob.

Processing performed after the stopping control (S14) or the deceleration control (S16) of FIG. 2 has been started will now be described. As shown in FIG. 6, when the vehicle 11 stops after the stopping control (S14) or the deceleration control (S16) has been started (S201), the PCS ECU 20 operates the brake ECU 26 to maintain the vehicle 11 in the stopped condition (S202). The vehicle 11 is maintained in the stopped condition for T seconds (S203).

If, during the T seconds, the obstacle Oa or the like detected by the sonar 12 is no longer detected or a new obstacle is discovered by the sonar 12 (S204), the PCS ECU 20 maintains the vehicle 11 in the stopped condition for another $T_{ADD}$ seconds to achieve a further improvement in safety (S205). In other words, in a case where a new obstacle is detected within the distance $L_X$, which is smaller than the braking subject distance $L_T$, while the vehicle 11 is stopped, if the driver rapidly accelerates the vehicle 11, the driver may be unable to decelerate the vehicle 11 sufficiently with respect to the new obstacle, because there is not a sufficient distance between the vehicle 11 and the new obstacle. Hence, in the case where a new obstacle is detected within the distance $L_X$, which is smaller than the braking subject distance $L_T$, while the vehicle 11 is stopped, an improvement in safety is achieved by maintaining the vehicle 11 in the stopped condition for the additional $T_{ADD}$ seconds.

Note that a value obtained by adding the predetermined $T_{ADD}$ seconds to the T seconds is set as a maximum limit for forcibly maintaining the vehicle 11 in the stopped condition in this case, and therefore the process of maintaining the vehicle 11 in the stopped condition is stopped thereafter even when the new obstacle continues to be detected by the sonar 12, except in a case where a further $T_B$ seconds are applied, as will be described below. However, while the brake pedal is depressed by the driver, the vehicle 11 is maintained in the stopped condition. Thus, it is possible to respond to cases in which, for example, the driver wishes to intentionally move closer to the obstacle Oa or the like so that the distance to the obstacle Oa or the like is shorter than the stopping target distance $L_D$, in order to, for example, enter a narrow parking space. Further, by not maintaining the vehicle 11 in the stopped condition continuously, the driver can be prevented from relying too much on the travel support apparatus 10.

The PCS ECU 20 determines whether or not a condition that the shift position of the transmission is not set at parking "P" and the driver is not pressing the brake pedal is satisfied, based on detection values from the shift sensor 16 and the brake pedal sensor 17 (S206). When the shift position of the transmission is not set at parking "P" and the driver is not pressing the brake pedal, it is determined that the driver is not paying sufficient attention to the obstacle Oa or the like.

Hence, when the shift position of the transmission is not set at parking "P" and the driver is not pressing the brake pedal (S206), the PCS ECU 20 uses the display device 28 to provide the driver with a warning to encourage the driver to press the brake pedal and confirm the safety of the surroundings (S207). Further, the PCS ECU 20 maintains the vehicle 11 in the stopped condition for the additional $T_B$ seconds, which is the time required to provide the driver with the warning (S208). Once the $T_B$ seconds have elapsed (S208), the PCS ECU 20 operates the engine ECU 24 and the brake ECU 26 regardless of whether or not an obstacle has been detected by the sonar 12, thereby gradually backing up the vehicle 11 while limiting the speed of the vehicle 11 (S209).

In other words, if the driver is pressing the accelerator pedal when the stopping control is terminated immediately after the elapse of the time T, the vehicle 11 may start moving rapidly, thereby impairing safety. Hence, in this embodiment, when the driver is not pressing the brake pedal after the stopping control, the PCS ECU 20 issues a warning to the driver while continuing the stopping control for the additional time $T_B$. If the brake pedal is not depressed even after the elapse of the time $T_B$, the vehicle 11 is backed up by reducing the target deceleration gradually while applying speed limitation. This speed limitation control is continued until the vehicle 11 has traveled a distance to a farthest obstacle, from among the obstacles detected at a time point at which the stopping control is terminated.

Figure 7:
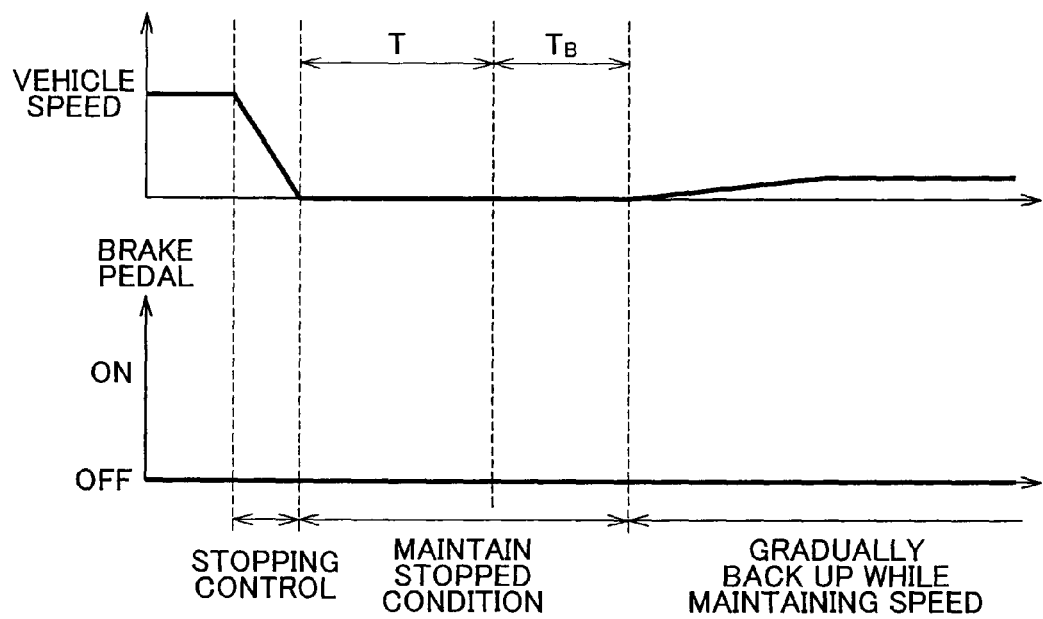
FIG. 7 is a graph showing a vehicle speed and a brake pedal operation in a case where the brake pedal is not depressed when the vehicle is to restart backing up after being stopped.

To summarize the operations described above, when the vehicle 11 is to restart backing up after being stopped in a situation where the shift position of the transmission is not set at "P" and the brake pedal is not depressed, as shown in FIG. 7, the vehicle 11 is maintained in the stopped condition for $T+T_B$ seconds following the stopping control, and once $T+T_B$ seconds has elapsed, the vehicle 11 restarts backing up.

Figure 8:
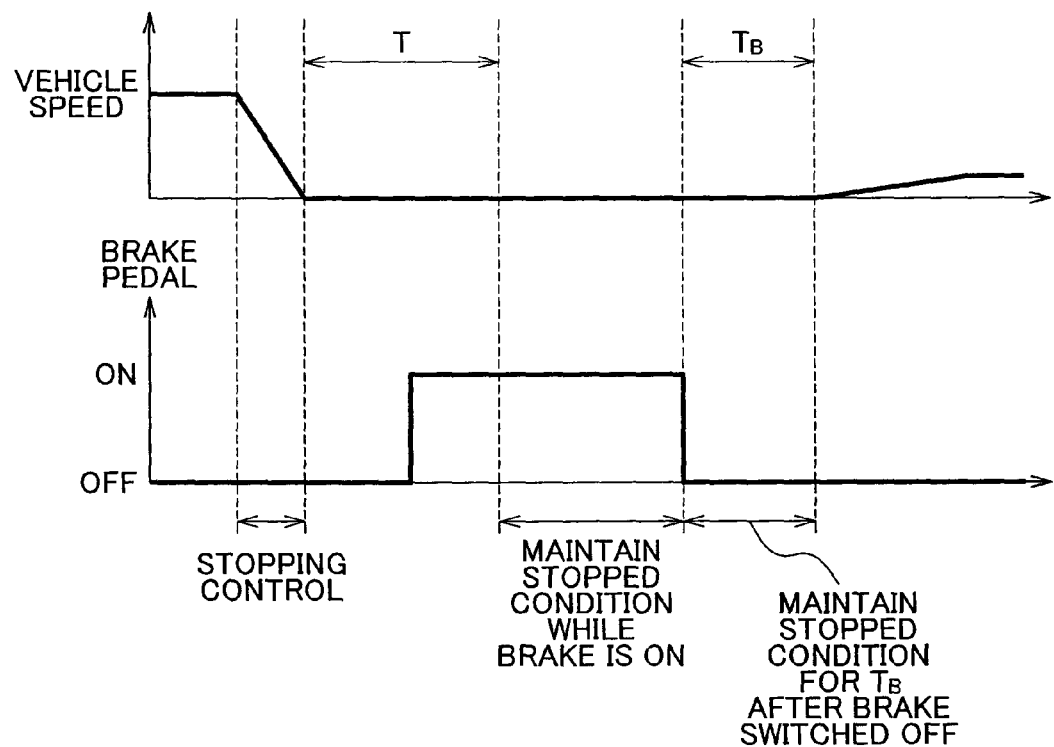
FIG. 8 is a graph showing the vehicle speed and the brake pedal operation in a case where the brake pedal is depressed when the vehicle is to restart backing up after being stopped.

When the vehicle 11 is to restart backing up after being stopped in a situation where the shift position of the transmission is not set at "P" and the brake pedal is depressed, as shown in FIG. 8, the vehicle 11 is maintained in the stopped condition as long as the brake pedal remains depressed, even after the elapse of T seconds following the stopping control. When the brake pedal is switched OFF (released), the vehicle 11 is maintained in the stopped condition for $T_B$ seconds, and then, the vehicle 11 restarts backing up.

Figure 9:
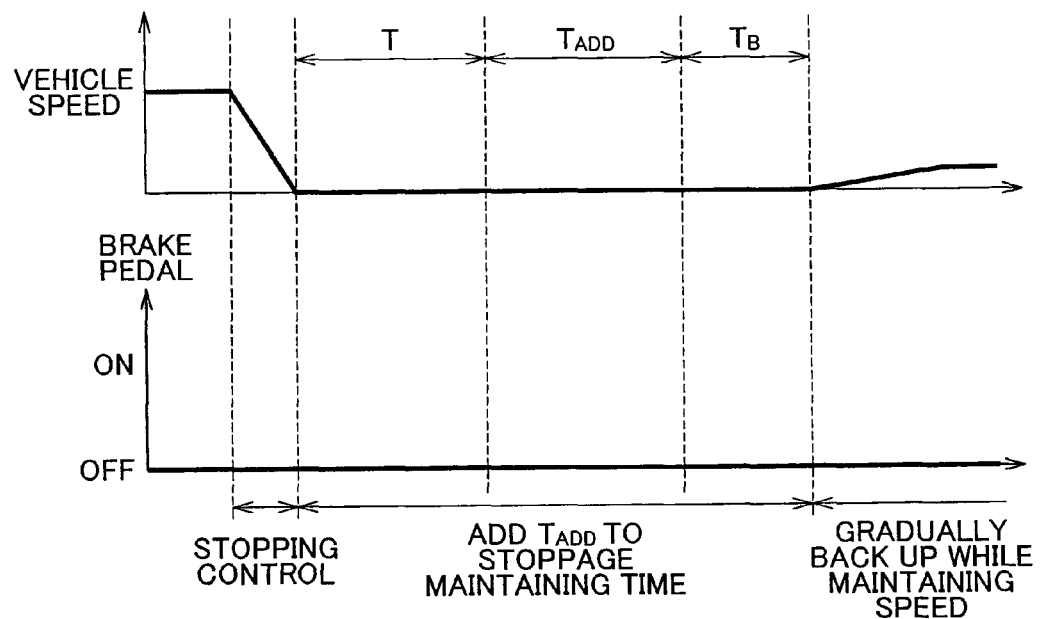
FIG. 9 is a graph showing the vehicle speed and the brake pedal operation in a case where the brake pedal is not depressed when the vehicle is to restart backing up after being stopped, and over a time T, the detected obstacle is no longer detected or a new obstacle is detected.

When the vehicle 11 is to restart backing up after being stopped in a situation where the shift position of the transmission is not set at "P", the brake pedal is not depressed, and the detected obstacle Oa or the like is no longer detected or a new obstacle is detected during the time T, as shown in FIG. 9, the vehicle 11 is maintained in the stopped condition for $T+T_{ADD}+T_B$ seconds following the stopping control, and once $T+T_{ADD}+T_B$ seconds has elapsed, the vehicle 11 restarts backing up.

Figure 10:
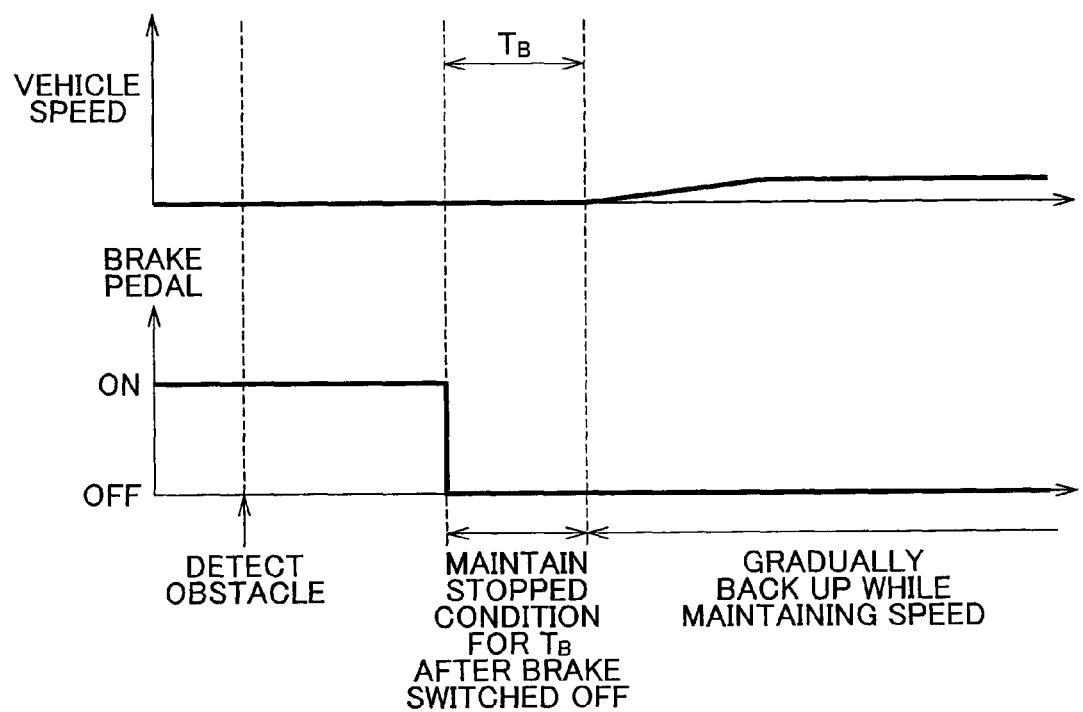
FIG. 10 is a graph showing the vehicle speed and the brake pedal operation in a case where the brake pedal is depressed when the vehicle is to restart backing up after being stopped, and over the time T, the detected obstacle is no longer detected or a new obstacle is detected.

When the vehicle 11 is to restart backing up after being stopped in a situation where the shift position of the transmission is not set at "P", the brake pedal is depressed, and the detected obstacle Oa or the like is no longer detected or a new obstacle is detected during the time T, as shown in FIG. 10, the vehicle 11 is maintained in the stopped condition for $T_B$ seconds after the brake pedal has been switched OFF (released), and then, the vehicle 11 restarts backing up.

Figure 11:
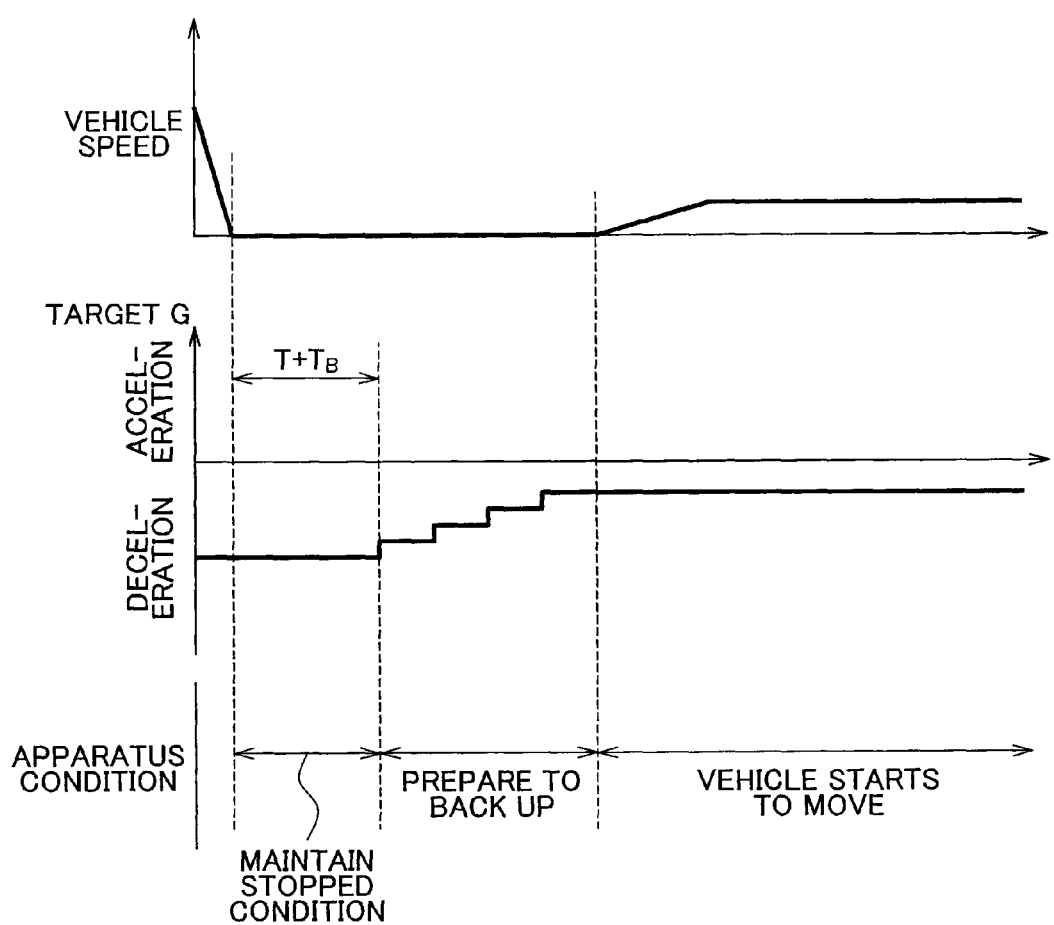
FIG. 11 is a graph showing the vehicle speed, a target G, and a condition of the travel support apparatus when the vehicle restarts backing up after being stopped.

When the vehicle 11 is to restart backing up, as shown in FIG. 11, the vehicle 11 is maintained in the stopped condition for a stopping time of $T+T_B$ seconds, for example, and then, the PCS ECU 20 causes the brake ECU 26 to change a target acceleration (deceleration) G (to be referred to hereafter as a target G) at a given gradient, thereby reducing a brake strength, in order to prepare for backing up. In other words, a braking force is reduced by reducing an operation amount set in the stopping control or the deceleration control. This control for reducing the operation amount set in the stopping control or the deceleration control may be regarded as second travel control according to the invention. When the target G (braking force) reaches a certain value, the vehicle 11 starts to move, that is, the vehicle 11 restarts backing up. At this time, the PCS ECU 20 causes the brake ECU 26 to apply a fixed braking force, thereby limiting the vehicle speed of the vehicle 11.

Once the vehicle has started to move, the PCS ECU 20 performs control by setting the target G so that the engine ECU 24 and the brake ECU 26 accelerate the vehicle 11 up to a target vehicle speed, as shown in FIG. 12, for example. Once the target vehicle speed has been reached, the PCS ECU 20 performs control by setting the target G so that the engine ECU 24 and the brake ECU 26 apply a fixed braking force to the vehicle 11.

Figure 13:
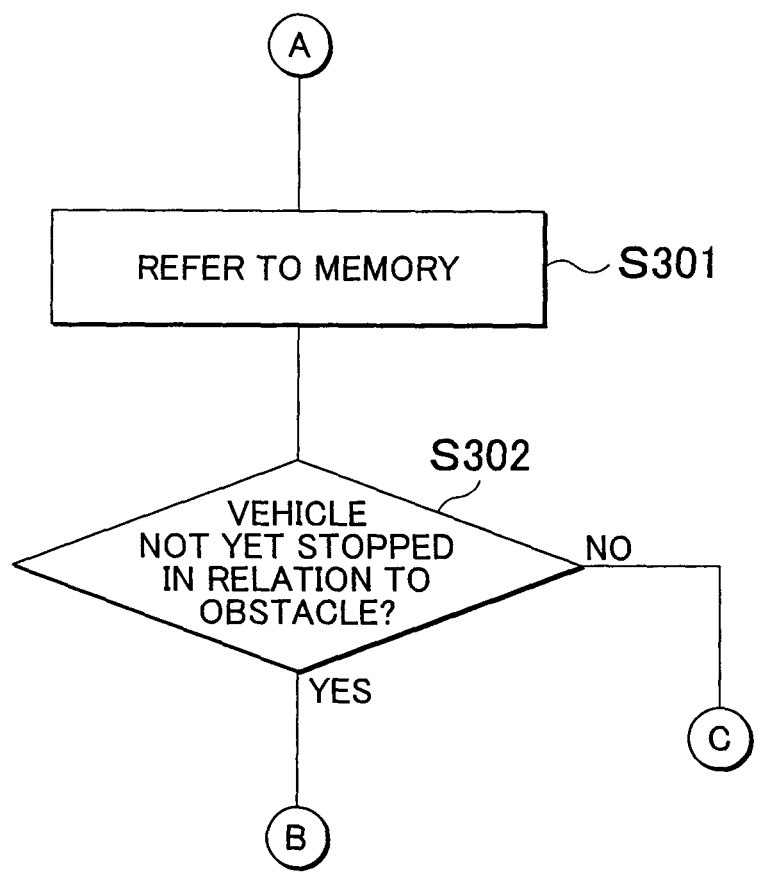
FIG. 13 is a flowchart showing in detail the operation performed when an obstacle is detected in FIG. 2.

Operations performed when the sonar 12 detects a plurality of obstacles will now be described in detail. As shown in FIG. 13, when an obstacle is detected in S12 of FIG. 2, the PCS ECU 20 refers to the memory 22 (S301). When the vehicle 11 is stopped after the stopping control in S14 in FIG. 2 or the deceleration control in S16 is started in relation to the obstacle Oa or the like detected by the sonar 12, the PCS ECU 20 records the obstacle Oa or the like in the memory 22 as a target on which stopping control is complete. When the vehicle 11 has not yet been stopped in relation to the obstacle detected by the sonar 12 (S302), the PCS ECU 20 continues the processing in S13 and subsequent steps in FIG. 2. When the vehicle 11 has already been stopped in relation to the obstacle detected by the sonar 12 (S302), on the other hand, the PCS ECU 20 does not perform the stopping control or the deceleration control in relation to the obstacle.

Figure 14:
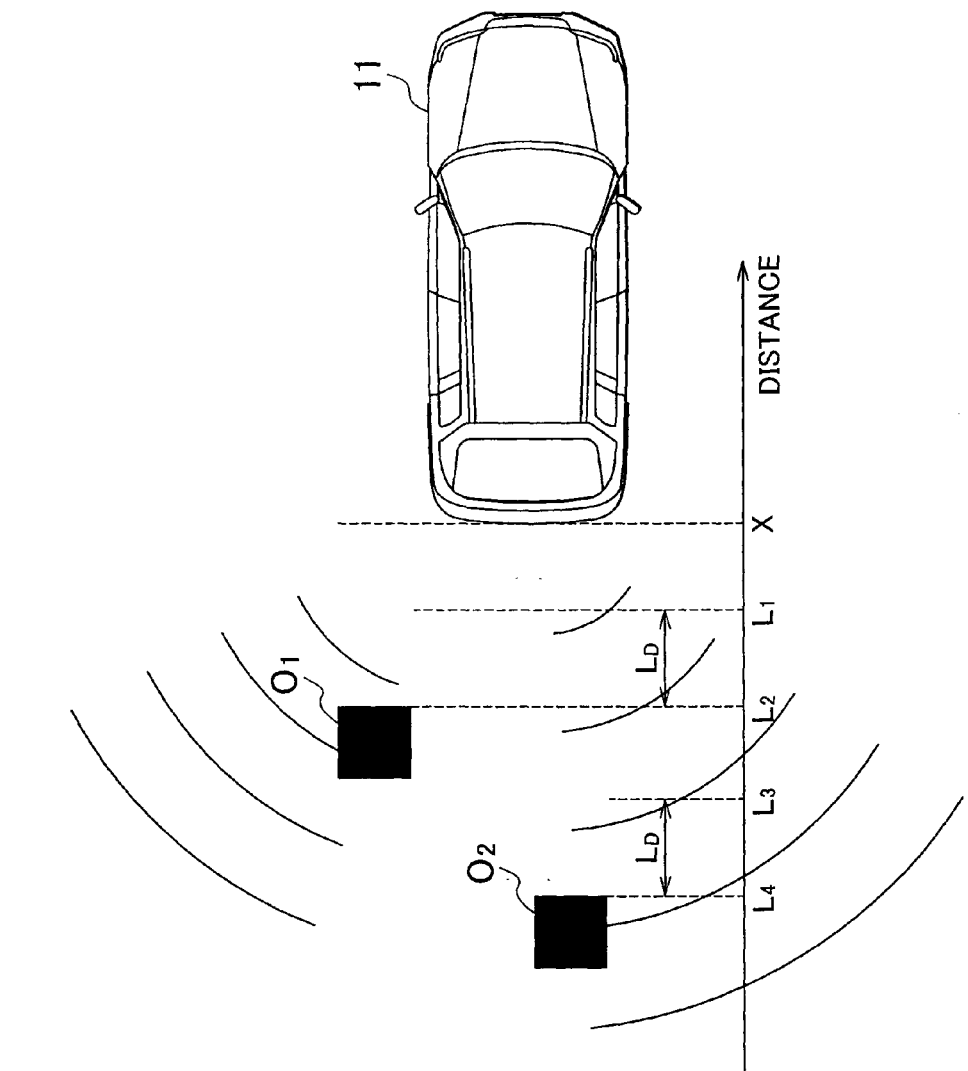
FIG. 14 is a plan view showing a condition in which a plurality of obstacles are detected when the vehicle backs up.

With respect to the control described above, in a case where the sonar 12 detects a plurality of obstacles $O_1$, $O_2$, as shown in FIG. 14, the PCS ECU 20 performs the deceleration control in relation to the obstacle $O_1$ when a distance X from a reference point to the vehicle 11 is greater than a distance $L_1$ from the reference point ($L_1$<X). When the distance X is equal to or smaller than the distance $L_1$ (X≤$L_1$), the PCS ECU 20 performs the stopping control in relation to the obstacle $O_1$. When the distance X is greater than a distance $L_3$ from the reference point ($L_3$<X), the PCS ECU 20 performs the deceleration control in relation to the obstacle $O_2$. When the distance X is equal to or smaller than the distance $L_3$ (X≤$L_3$), the PCS ECU 20 performs the stopping control in relation to the obstacle $O_2$. When the distance X is smaller than a distance $L_4$ from the reference point (X<$L_4$), the PCE ECU 20 terminates the control.

In FIG. 14, when the vehicle 11 restarts backing up after the stopping control has been performed in relation to the obstacle $O_1$, the distance $L_X$ between the obstacle $O_1$ and the vehicle 11 is smaller than the stopping target distance $L_D$, and therefore, if the processing in FIG. 2 is performed as is, the travel support apparatus 10 may perform the stopping control again, making it impossible to back up the vehicle 11. Hence, in this embodiment, information indicating whether or not the vehicle 11 was stopped in the past following the start of the stopping control or the deceleration control is stored in relation to each obstacle detected by the sonar 12, and the stopping control is not performed again in relation to a subject for which the vehicle 11 was stopped. Thus, it is possible to back up the vehicle 11. When an obstacle for which the vehicle 11 was not stopped in the past reaches a distance at which the stopping control is to be performed, on the other hand, the PCS ECU 20 performs the stopping control.

In other words, with respect to an obstacle for which the vehicle 11 was stopped, it is determined that the driver wishes to back up the vehicle 11 further, and therefore it is made possible to back up the vehicle 11. With respect to an obstacle for which the vehicle 11 has not yet been stopped, on the other hand, it is determined that the driver has not noticed the obstacle or expects the travel support apparatus 10 to perform the stopping control, and therefore the stopping control is performed.

Figure 15:
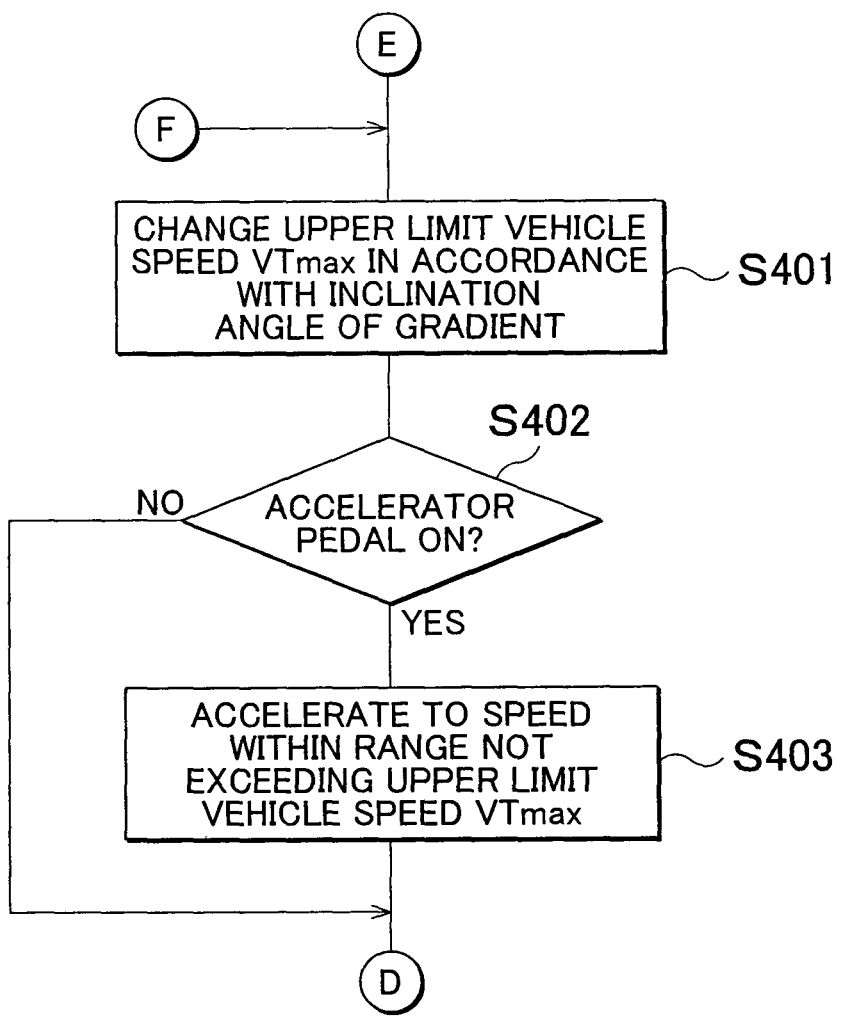
FIG. 15 is a flowchart showing in detail operations performed after deceleration control is started in FIG. 2 and after the vehicle restarts backing up in FIG. 6.

Operations performed after the deceleration control is started in S16 in FIG. 2 and after the vehicle 11 restarts backing up in S209 in FIG. 6 will now be described in detail. As shown in FIG. 15, after the deceleration control is started in S16 in FIG. 2 and after the vehicle 11 restarts backing up in S209 in FIG. 6, the PCS ECU 20 changes an upper limit vehicle speed $VT_{max}$ in accordance with an inclination angle of a gradient detected by the incline sensor 19 (S401). In the case of an uphill gradient, for example, the upper limit vehicle speed $VT_{max}$ is increased. When the accelerator pedal sensor 18 detects that the accelerator pedal is depressed (S402), the PCS ECU 20 operates the engine ECU 24 and the brake ECU 26 to accelerate the vehicle 11 to a speed within a range not exceeding the upper limit vehicle speed $VT_{max}$ (S403). In this case, the PCS ECU 20 may set a lower limit deceleration $AT_{min}$ serving as a lower limit value of the target deceleration, instead of the upper limit vehicle speed $VT_{max}$, and perform control in a manner such that the deceleration does not fall below the lower limit deceleration $AT_{min}$. Alternatively, the PCS ECU 20 may use both the upper limit vehicle speed $VT_{max}$ and the lower limit deceleration $AT_{min}$.

After the deceleration control is started in S16 in FIG. 2 and after the vehicle 11 restarts backing up in S209 in FIG. 6, the vehicle 11 is decelerated or caused to travel at an extremely low speed regardless of the intentions of the driver. In this case, certain drivers may wish to accelerate the vehicle 11 a little more, after having understood that the obstacle Oa or the like exists behind the vehicle 11. Further, on an uphill gradient or in a full lock condition where a steering angle is increased to a left or right limit, greater resistance is applied to the vehicle 11 than on a flat road or when the steering angle is small, and therefore, depending on the speed limitation control performed after the deceleration control is started or after the vehicle 11 restarts backing up, the vehicle 11 may stop. Hence, in this embodiment, when the driver has depressed the accelerator pedal, it is determined that the driver wishes to accelerate the vehicle 11, and therefore the target deceleration is reduced gradually by increasing the accelerator operation amount non-linearly. As a result, the vehicle 11 can be accelerated on an uphill gradient or in a full lock condition where the steering angle is increased to the left or right limit.

Figure 16:
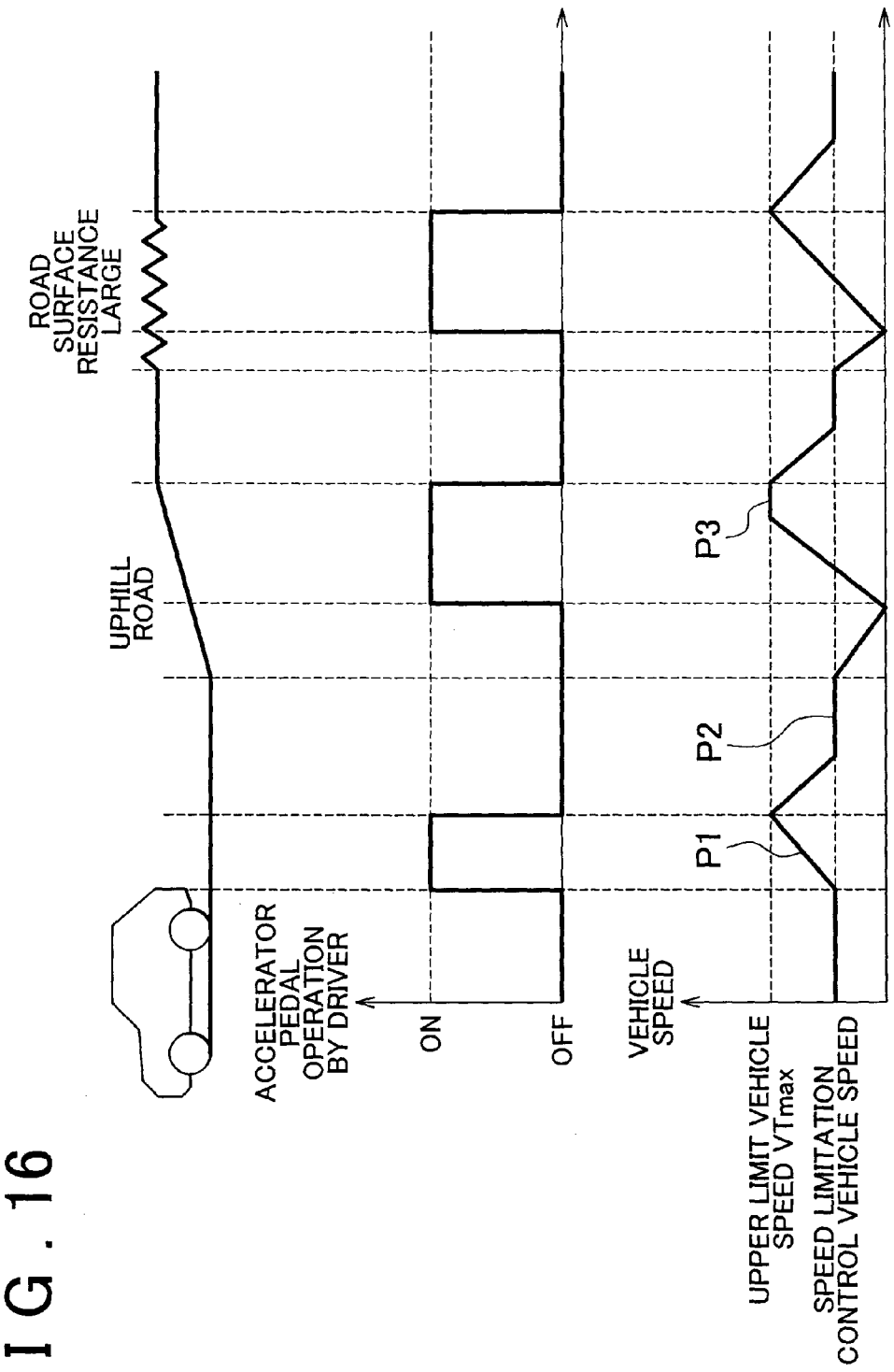
FIG. 16 is a graph showing an accelerator pedal operation performed by the driver and the vehicle speed when the vehicle backs up on an uphill road and a road exhibiting great road surface resistance.

As shown in FIG. 16, when the driver switches the accelerator pedal ON (depresses the accelerator pedal) in a situation where the vehicle 11 is approaching an uphill road or a location exhibiting great road surface resistance, the PCS ECU 20 increases the vehicle speed gently by gradually reducing the target deceleration (P1). When the driver removes his/her foot from the accelerator pedal, the PCS ECU 20 returns the vehicle speed to the original speed limitation control vehicle speed by gradually increasing the target deceleration (P2). The PCS ECU 20 then controls the vehicle speed so that the vehicle speed does not exceed the upper limit vehicle speed $VT_{max}$.

Figure 17:
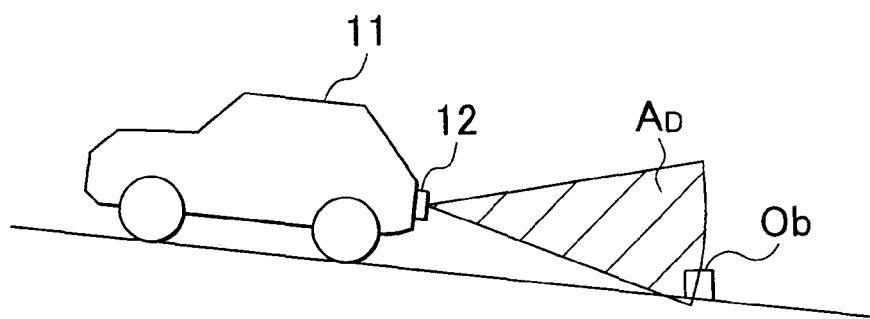
FIG. 17 is a side view showing a situation in which the vehicle backs up on a downhill gradient.

Likewise with regard to a downhill gradient such as that shown in FIG. 17, the PCS ECU 20 corrects the upper limit vehicle speed $VT_{max}$ in accordance with the inclination angle of the gradient detected by the incline sensor 19. In the case of a downhill gradient, the upper limit vehicle speed $VT_{max}$ is reduced. As a result, the vehicle 11 can be decelerated appropriately with respect to the obstacle Ob or the like regardless of the gradient.

Figure 18:
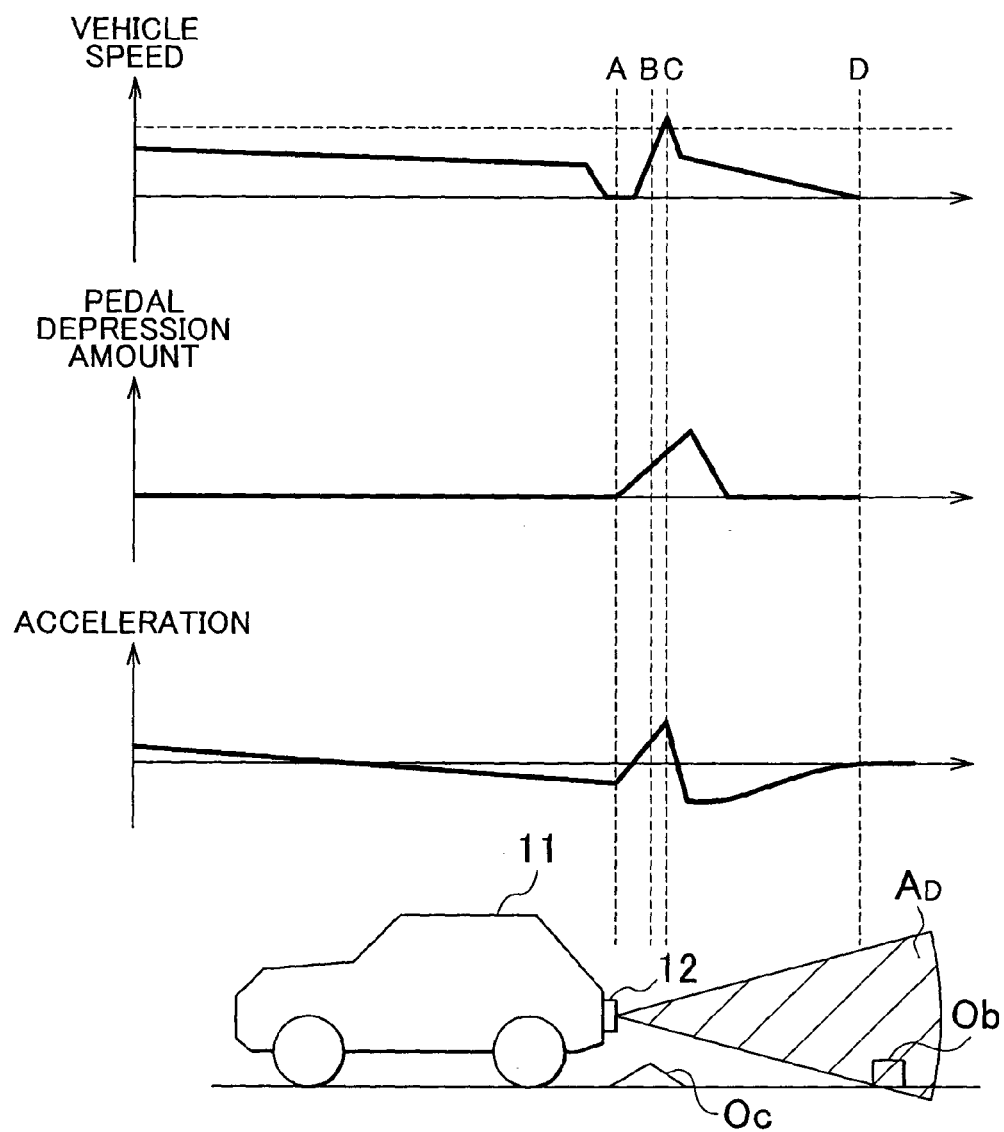
FIG. 18 is a graph showing the vehicle speed, an accelerator pedal depression amount, and an acceleration in a case where a wheel block and an on-road object that should be traveled over before hitting the wheel block exist as obstacles.

As shown in FIG. 18, when an obstacle (an on-road object) Oc, over which the vehicle 11 should travel, exists in front of the obstacle Ob, the vehicle 11 is stopped, as shown by A in FIG. 18. In this case, the driver depresses the accelerator pedal. Accordingly, the PCS ECU 20 reduces the braking force (i.e., the PCS ECU 20 reduces the operation amount) so that the vehicle 11 restarts backing up. Then, the PCS ECU 20 increases the upper limit vehicle speed $VT_{max}$ slightly in accordance with the gradient of the obstacle Oc. As shown by B in FIG. 18, the vehicle speed increases in accordance with an increase in the accelerator pedal depression amount. As shown by C in FIG. 18, the vehicle speed is to exceed the upper limit vehicle speed $VT_{max}$ after the vehicle 11 travels over the obstacle Oc. Hence, the PCS ECU 20 returns the upper limit vehicle speed $VT_{max}$ to its original value, and then operates the engine ECU 24 and the brake ECU 26 to control the vehicle speed of the vehicle 11 to a range not exceeding the reduced upper limit vehicle speed $VT_{max}$. Thus, the vehicle 11 can be stopped in front of the obstacle Ob.

In the travel support device 10 according to this embodiment, if the obstacle Oa approaches a distance from the vehicle 11 (a range) at which the obstacle Oa cannot be detected by the sonar 12 as the vehicle 11 backs up, the PCS ECU 20 controls travel of the vehicle 11 based on the distance between the obstacle Oa and the vehicle 11 estimated based on the distance traveled by the vehicle 11 from the position in which the obstacle Oa could be detected by the sonar 12. When the distance between the vehicle 11 and the obstacle Oa is too short, the sensors provided in the vehicle 11, such as the sonar 12, may become incapable of detecting the obstacle Oa so that the previously detected obstacle Oa can no longer be detected. Hence, according to this embodiment, the distance between the obstacle Oa and the vehicle 11 can be estimated in a situation where the vehicle 11 moves too close to the obstacle Oa such that the obstacle Oa enters a range in which detection of the obstacle Oa by the sonar 12 is no longer possible, and is therefore no longer detected. Thus, control can be performed to prevent contact between the obstacle Oa and the vehicle 11, based on the estimated distance.

Further, in this embodiment, the sonar 12 is provided as the rear sensor, and therefore an obstacle such as a person can be detected reliably within a wide short-distance range when the vehicle 11 backs up at a comparatively low speed. Thus, detection can be performed appropriately in accordance with a positional relationship between the vehicle 11 and the obstacle that should be detected.

Furthermore, in this embodiment, to prevent contact between the vehicle 11 and the obstacle Oa detected by the sonar 12 as the vehicle 11 backs up, the deceleration control or the stopping control (first travel control) is performed to apply at least one of speed limitation and deceleration to the vehicle, without requiring an operation performed by the driver of the vehicle 11, and then, the control (second travel control) is performed to reduce the operation amount set in the deceleration control or the stopping control (first travel control). Hence, it is possible to respond to a situation in which the driver of the vehicle 11 wishes to accelerate the vehicle 11 in order to, for example, come closer to the obstacle Oa or the like after the vehicle 11 has been decelerated by the PCS ECU 20 in relation to the obstacle Oa. Further, it is possible to avoid a situation in which the PCS ECU 20 decelerates the vehicle 11 in relation to the obstacle Oa indefinitely such that the driver of the vehicle 11 relies too much on the travel support apparatus 10.

Moreover, according to this embodiment, when a predetermined condition is satisfied after the deceleration control or the stopping control (first travel control) is performed, the PCS ECU 20 performs the control (second travel control) to reduce the operation amount set in the deceleration control or the stopping control (first travel control). Therefore, by setting the condition appropriately, it is possible to respond to a situation in which the driver wishes to accelerate the vehicle 11, while preventing the driver from relying too much on the travel support apparatus.

Furthermore, according to this embodiment, after performing the deceleration control or the stopping control (first travel control), the PCS ECU 20 causes the vehicle to restart backing up by performing the control (second travel control) to gradually reduce the operation amount set in the deceleration control or the stopping control (first travel control). Therefore, it is possible to avoid a situation in which the vehicle is rapidly started or rapidly accelerated when the accelerator pedal is depressed by the driver at the time at which the deceleration control or the stopping control is stopped.

Further, according to this embodiment, when the deceleration control is underway, the PCS ECU 20 reduces the operation amount in the deceleration control in accordance with the accelerator pedal operation performed by the driver of the vehicle 11. It is therefore possible to respond to a situation in which the driver wishes to accelerate the vehicle 11 after having understood that the obstacle Oa exists behind the vehicle 11, and a situation in which the vehicle may be stopped by the deceleration control, for example, when the vehicle 11 backs up on an uphill gradient or when the steering angle is extremely large, in accordance with the accelerator pedal operation performed by the driver.

Furthermore, according to this embodiment, when the obstacle $O_2$ is detected by the sonar 12 after the PCS ECU 20 performs the deceleration control or the stopping control to prevent contact between the vehicle 11 and the obstacle $O_1$ detected by the sonar 12 as the vehicle 11 backs up, the PCS ECU 20 performs the deceleration control or the stopping control to prevent contact between the vehicle 11 and the obstacle $O_2$. Hence, even when the operation amount set in the deceleration control or the stopping control relating to the obstacle $O_1$ has been reduced, the deceleration control or the stopping control is performed in relation to the newly detected obstacle $O_2$, and therefore contact between the vehicle 11 and the obstacle $O_2$ can be prevented in a case where the driver of the vehicle 11 does not notice the obstacle $O_2$ or wants the travel support apparatus 10 to perform the deceleration control or the stopping control.

Moreover, according to this embodiment, after performing the deceleration control or the stopping control to prevent contact between the vehicle 11 and the obstacle $O_1$ detected by the sonar 12 as the vehicle 11 backs up, the PCS ECU 20 does not perform the deceleration control or the stopping control in relation to the obstacle $O_1$ again. Hence, it is possible to respond to a situation in which the driver of the vehicle wishes to back up the vehicle 11 further toward an obstacle for which the deceleration control or the stopping control has been performed once.

Furthermore, in this embodiment, the travel support apparatus 10 includes the radar 14 that detects an obstacle in front of the vehicle 11, the sonar 12 that detects an obstacle behind the vehicle 11, and the PCS ECU 20 that controls travel of the vehicle 11 so as to prevent contact between the vehicle 11 and an obstacle detected by the radar 14 or the sonar 12 when the vehicle travels forward and when the vehicle backs up. Therefore, contact between the vehicle 11 and an obstacle can be prevented both when the vehicle travels forward and when the vehicle backs up. Further, the radar 14 is a different kind of sensor from the sonar 12. The radar 14 is able to detect an obstacle positioned at a great distance from the vehicle 11, as compared to the sonar 12. Therefore, detection can be performed appropriately in accordance with the positional relationship between the vehicle 11 and an obstacle that should be detected, when the vehicle 11 backs up at a speed in a comparatively low-speed range, and when the vehicle 11 travels forward at a speed in a comparatively high-speed range. Moreover, the cost of the sensors can be reduced.

Furthermore, according to this embodiment, the detection range of the sonar 12 equals or exceeds the detection range of the radar 14 at an equal distance from the vehicle 11. Therefore, when the vehicle 11 travels forward at a comparatively high speed, detection can be performed appropriately in accordance with the positional relationship between the vehicle 11 and an obstacle that should be detected, such as another vehicle, by increasing the directivity in order to detect an obstacle existing within a long-distance narrow range. Further, when the vehicle 11 backs up at a comparatively low speed, detection can be performed appropriately in accordance with the positional relationship between the vehicle 11 and an obstacle that should be detected, such as a person, by reducing the directivity in order to detect an obstacle existing within a short-distance wide range.

Moreover, according to this embodiment, at least one of the radar 14, a camera, and a laser radar is used as the front sensor, and therefore an obstacle such as another vehicle existing within a long-distance narrow range can be detected reliably when the vehicle 11 travels forward at a comparatively high speed. Hence, detection can be performed appropriately in accordance with the positional relationship between the vehicle 11 and an obstacle that should be detected.

Note that the invention is not limited to the embodiment described above, and various modifications may be added thereto within a scope that does not depart from the invention. For example, although operations performed when the vehicle 11 backs up are mainly described in the above embodiment, similar operations are performed when the vehicle 11 travels forward.

The invention claimed is:

1. A travel support apparatus comprising:
a rear sensor configured to detect an obstacle behind a vehicle; and
a rear contact prevention controller configured to control travel of the vehicle to prevent contact between the vehicle and the obstacle detected by the rear sensor as the vehicle backs up,
the rear contact prevention controller being configured to execute
a first travel control to apply at least one of speed limitation and deceleration to the vehicle independent of an operation performed by a driver of the vehicle, and
a subsequent second travel control to provide a reduced operation amount of the at least one of speed limitation and deceleration set in the first travel control in response to the vehicle restarting backing up to move closer to the obstacle, the second travel control being executed independent of an operation performed by the driver of the vehicle, the rear contact prevention controller being configured to execute the second travel control in response to a predetermined amount of time elapsing from completion of the first travel control.

2. The travel support apparatus according to claim 1, wherein
the first travel control includes stopping control executed by the rear contact prevention controller to stop the vehicle by decelerating the vehicle, and deceleration control executed by the rear contact prevention controller to apply at least one of speed limitation and deceleration to the vehicle,
the rear contact prevention controller is configured to execute the stopping control in response to a distance between the vehicle and the obstacle being equal to or smaller than a first predetermined distance, and
the rear contact prevention controller is configured to execute the deceleration control in response to the distance between the vehicle and the obstacle being greater than the first predetermined distance and smaller than a second predetermined distance.

3. The travel support apparatus according to claim 1, wherein,
in response to the vehicle stopping after the first travel control is started, the rear contact prevention controller is configured to maintain the vehicle in a stopped condition for the predetermined amount of time, and then to execute the second travel control.

4. The travel support apparatus according to claim 1, wherein
the rear contact prevention controller is configured to execute the second travel control in response to a predetermined condition being satisfied after the first travel control is executed.

5. The travel support apparatus according to claim 1, wherein
the rear contact prevention controller is configured to cause the vehicle to restart backing up, by executing the second travel control to gradually reduce the operation amount set in the first travel control, after executing the first travel control.

6. The travel support apparatus according to claim 1, wherein
the rear contact prevention controller is configured to reduce the operation amount in the first travel control in accordance with an accelerator pedal operation performed by the driver of the vehicle during the first travel control.

7. The travel support apparatus according to claim 1, wherein
the obstacle detected by the rear sensor includes a first obstacle and a second obstacle, and
in response to the second obstacle being detected by the rear sensor after the first travel control is executed by the rear contact prevention controller to prevent contact between the vehicle and the first obstacle detected by the rear sensor as the vehicle backs up, the rear contact prevention controller is configured to execute the first travel control to prevent contact between the vehicle and the second obstacle.

8. The travel support apparatus according to claim 1, wherein,
the rear contact prevention controller is configured to refrain from executing the first travel control in relation to the obstacle after the first travel control is executed by the rear contact prevention controller to prevent contact between the vehicle and the obstacle detected by the rear sensor as the vehicle backs up.

9. The travel support apparatus according to claim 1, wherein
the rear contact prevention controller is configured to reduce a braking force by reducing the operation amount in the second travel control.

* * * * *